(No Model.)
F. T. WILSON.
SOLAR CAMERA.
No. 460,417.  Patented Sept. 29, 1891.
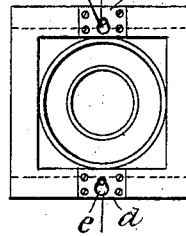
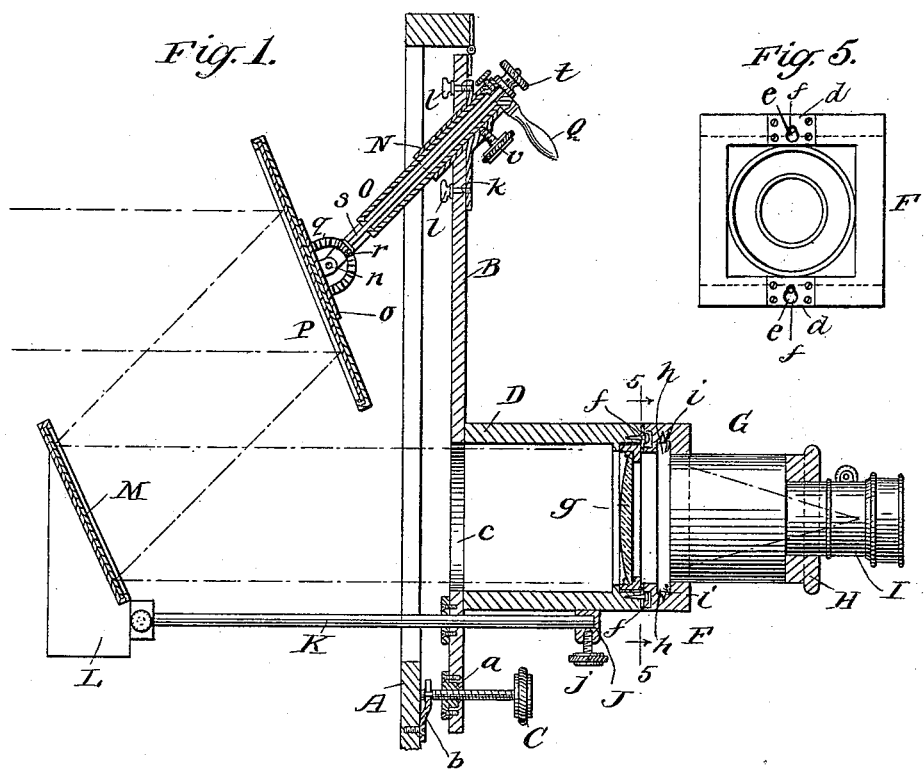
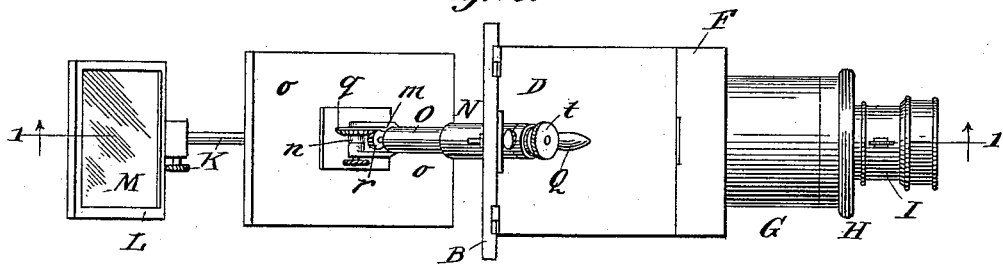
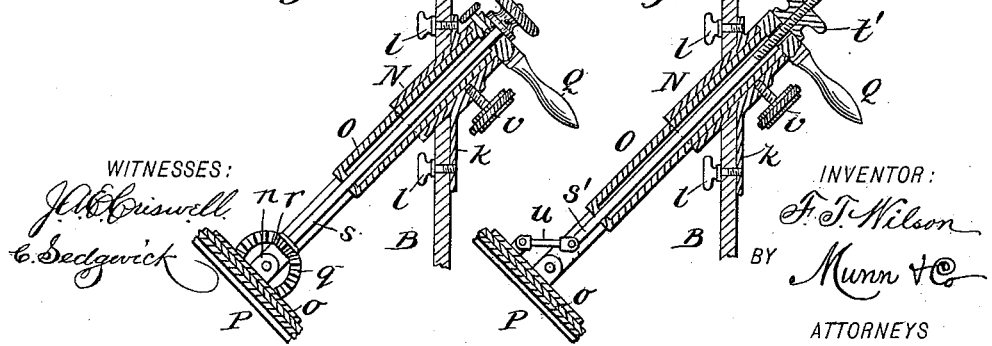
WITNESSES:
INVENTOR:
F. T. Wilson
BY Munn & Co.
ATTORNEYS

UNITED STATES PATENT OFFICE.

FRANK THOMAS WILSON, OF STILLWATER, MINNESOTA.

SOLAR CAMERA.

SPECIFICATION forming part of Letters Patent No. 460,417, dated September 29, 1891.

Application filed December 5, 1890. Serial No. 373,645. (No model.)

*To all whom it may concern:*

Be it known that I, FRANK THOMAS WILSON, of Stillwater, in the county of Washington and State of Minnesota, have invented a new and Improved Solar Camera, of which the following is a specification, reference being had to the annexed drawings, forming a part thereof, in which—

Figure 1 is a vertical longitudinal section of my improved solar camera, taken on line 1 1 in Fig. 2. Fig. 2 is a plan view. Fig. 3 is an enlarged longitudinal section of one form of the mirror-moving apparatus, taken on line 1 1 of Fig. 2. Fig. 4 is an enlarged longitudinal section of another form of the mirror-moving apparatus, taken on line 1 1 of Fig. 2; and Fig. 5 is a rear elevation of the objective-support.

Similar letters of reference indicate corresponding parts in all the views.

My invention consists in the combination, with projecting lenses, of a fixed inclined mirror for directing the sun's rays into the projecting apparatus and an adjustable mirror mounted on a revoluble support and adapted to receive the light from the sun and reflect it upon the fixed mirror.

My invention consists in means for adjusting the revoluble mirror and in devices for adjusting the entire solar camera, all as will be hereinafter more fully described.

The frame A, which supports the solar camera, is to be fitted to a door or window or a suitable opening in the wall. To the upper part of the frame A is secured by separable hinges a board B, which is provided at its lower end with adjusting-screws C, which pass through nuts a, secured to the board, and are swiveled in a plate b, attached to the frame A. In the board B is formed an aperture c, and to the board is secured a box D, which covers the said aperture c. To the front of the box D is secured an apertured block F by means of plates d, attached to the block and provided with key-slots e for receiving screws f, projecting from the front of the said box D. In the outer end of the box D, at the top and bottom, are formed grooves for receiving the frame of the condenser g. The block F is fitted to a tube G. In the block F there is a passage h for receiving slides to be projected by the instrument, and in the passage are arranged springs i for pressing the slides back upon the rear wall of the passage. To the front of the tube G is fitted an annular block H, which receives the objective I. A binding-post J, secured to the bottom of the box D, is provided with a screw j and is adapted to receive and clamp one end of a rod K, which passes through an opening in the board B and carries at its lower end an angular block L, upon which is mounted the inclined mirror M.

In the upper portion of the board B is inserted an inclined sleeve N, which is preferably formed of metal, integrally with the base-plate k, the said base-plate being attached to the board B by thumb-screws l, passing through the board and into the base-plate. To the sleeve N is fitted a tubular shaft O, the said shaft O being furnished with a fork m at its lower end, in which is pivoted an ear n, projecting from the back of the plate o, which carries the mirror P. The upper and inner end of the tubular shaft O is furnished with a lever Q, by which it may be turned.

Any well-known mechanical device for tilting the mirror P on the tubular shaft O may be employed. I have shown two devices for accomplishing this, one consisting of a bevel-toothed segment q, attached to the back of the mirror, and a pinion r, engaging the toothed segment q and mounted on a spindle s, extending through the tubular shaft O. The upper and inner end of the spindle s is provided with a milled head t, by which it may be turned. The other device consists of a link u, jointed to the back of the plate o, carrying the mirror, and also jointed to the outer end of the spindle s', as shown in Fig. 4. In this case the spindle s' has longitudinal instead of rotary motion, and it is moved lengthwise of the tubular shaft O by means of the milled nut t', placed on its threaded outer end.

It will be observed that the mirror P may be adjusted at any desired angle by means of the pinion and toothed segment and by the spindle s' and link u and that it may be rotated by turning the tubular shaft O by means of the lever Q.

By removing the frame A from the opening in the wall the entire apparatus may be moved bodily, and if it is desired to reduce it to more compact form the board B may be detached from the frame, the rod K, carrying the mirror M, may be removed, the tubular shaft O removed from the sleeve N, and the projecting apparatus, consisting of the block F and parts attached thereto, may be removed by detaching the plates d from the studs f.

By providing a triangular casing furnished with a mirror arranged at an angle of forty-five degrees and providing grooves for receiving the condenser g the objective may be placed in a vertical position by interposing the triangular box between the box D and block F and transferring the condenser from the box D to the triangular casing.

Having thus described my invention, I claim as new and desire to secure by Letters Patent—

1. In a solar camera, the combination, with the upright supporting-frame having a box D in line with its opening c, provided on its under side with a socket J, having a set-screw j, of the rod K, extending from said socket through the frame beyond the front thereof and provided at its outer end with a mirror, and an upper mirror adjustably supported on the frame, at the front side thereof, substantially as set forth.

2. The combination, with the upright supporting-frame provided on its rear side with the box D in line with its opening c and a lower mirror in front of said opening, of the inclined sleeve N, extending through the frame, a tubular shaft turning in the said tube and having an operating-handle at its upper end and a pivoted mirror at its lower end, a spindle extending down through the shaft and connected with the mirror to rock it on its axis, and means for operating the spindle, substantially as set forth.

3. The combination, with the upright frame, the box D, carried thereby in line with its opening c, and a lower mirror adjustable toward and from the front of the frame, of the sleeve N, extending through the frame above the opening c, a rotary tubular shaft extending through the sleeve and provided at its lower end with a pivoted mirror and at its upper end with a handle, a rotary spindle extending down through the shaft, and gearing connecting the lower end of the spindle and the mirror, substantially as set forth.

4. A frame for solar cameras, consisting in the front section A, the rear section or board B, hinged at its upper end to the said front section, and a thumb-screw extending through a nut on the rear section and swiveled at its inner end to the front section, substantially as set forth.

5. A solar camera consisting in the frame A, the board or inner section B, having an opening c and hinged at its upper end to the front of frame A, a set-screw passing through a nut a on the board B and swiveled at its inner end to the frame A, the box D, carrying the condenser, the block F, provided with the slide-passage, the tube G, and the objective I, the rod K, carrying the mirror at its front end, and the mirror P above the opening c and provided with the adjusting mechanism, substantially as set forth.

6. In a solar camera, the combination of the box D, provided with the studs f and furnished with the condensing-lens g, the apertured block F, having the transverse passage h, the springs i, placed in the passage, and the objective I and objective-support, substantially as specified.

FRANK THOMAS WILSON.

Witnesses:
JAS. L. GARLAND,
F. V. COMFORT.